Figures 1, 2, 3, 4:
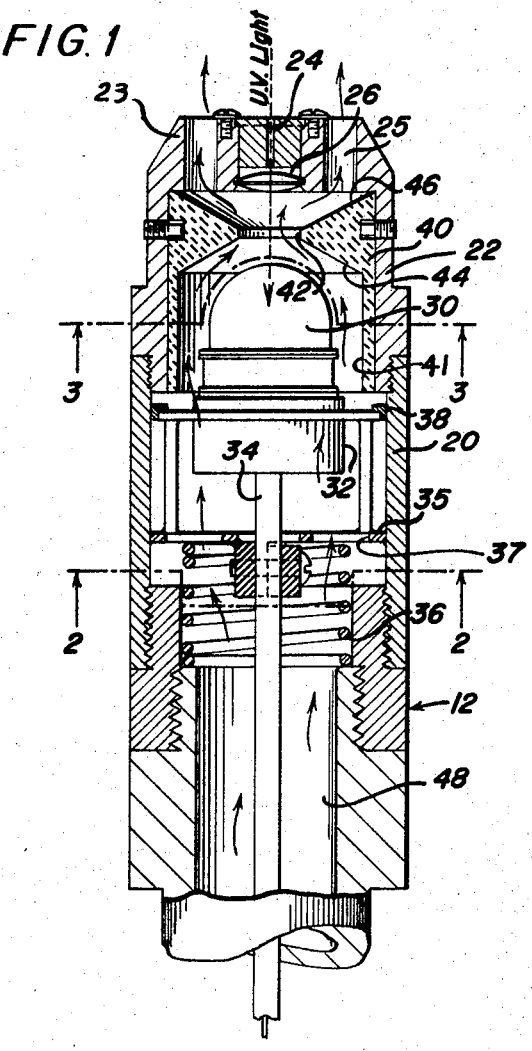

INVENTOR.
WILLIAM J. MOORE
BY
Richard H. Thomas
ATTORNEY 3,437,807
ULTRAVIOLET SENSITIVE FLAME DETECTOR IN COOLED HOUSING
William J. Moore, Dallas, Tex., assignor to Forney Engineering Company, Dallas, Tex., a corporation of Texas
Continuation of application Ser. No. 618,677, Feb. 27, 1967. This application Apr. 8, 1968, Ser. No. 719,768
Int. Cl. G01t 1/12; H01j 39/02
U.S. Cl. 250—83                                6 Claims This invention relates to flame scanners or detectors and particularly to means for cooling the same.

Flame detectors for furnaces are well-known, and usually utilize an electronic tube suitable for the detection of ultraviolet light. One such tube is covered by Patent No. 3,047,761, Radiation Detector Tubes, granted to Dennis H. Howling. The present invention relates generally to the device which houses this and other electronic tubes capable of sensing ultraviolet light.

It is known to provide housings for ultraviolet sensing tubes and generally these housings are constructed to more or less shield the tube from high temperatures, but at the same time, provide a means or opening by which the ultraviolet light is admitted to the electronic elements of the tube. However, for the ultraviolet light to reach the sensing elements, it is essential for the housing opening to focus directly on the flame being detected. This is difficult to do with respect to burners which for one reason or another travel, for instance up and down, and for such burners, it is conventional practice to position the housing and ultraviolet sensing tubes within the burner to travel with the burner. Quite obviously, the temperatures within the burner are extreme, in the order of 1800° F. As it is necessary to protect the electronic components, capable of withstanding temperatures in the order of about 400° F., from these high temperatures, it has been conventional practice to place the housing for the electronic tube within an outer cylindrical casing, and to pass cooling air between the housing and outer casing. However, this has required large amounts of air at high pressure, in the order of 100 s.c.f.m. at 5 pounds pressure.

This disadvantage is overcome in accordance with the present invention. The flame detector of the present invention comprises a housing having an open outboard end which is disposed in a high temperature zone of a burner, and a front piece partly closing the opening of said outboard end. The front piece includes a front face which defines an aperture disposed axially relative the axis of the housing, and a plurality of peripherally disposed passageways spaced radially to the sides of the aperture. An ultraviolet sensing tube is disposed within the housing close to the front face thereof. Between the aperture of the front face and the electronic tube, means are provided supporting a suitable lens to focus ultraviolet light from the front face aperture on the sensing elements of the tube. A source of cooling fluid provides a coolant within the housing and around the electronic tube. An insert within the housing encompasses but is spaced from the electronic tube and is shaped as an elongated member having inside surfaces approximately paralleling the surface of the electronic tube, and an axial opening between the electronic tube and the lens. The shape of the insert inside surface is such as to direct a uniform high velocity flow of cooling fluid close to and over the surface of the electronic tube. The insert is also shaped to direct the cooling fluid outwardly from its axial opening through the peripherally disposed passageways in the detector front piece.

The present invention achieves equal or better cooling of the electronic tube using only a half pound pressure and 5 s.c.f.m. of air.

The invention and advantages thereof will become apparent upon consideration of the following specification, with reference to the accompanying drawing, in which
FIGURE 1 is a section view of a flame detector in accordance with the invention;
FIGURE 2 is a section view taken along line 2—2 of FIG. 1;
FIGURE 3 is a section view taken along line 3—3 of FIG. 1; and
FIGURE 4 is a section view showing a flame detector assembly in accordance with the invention.

Referring to FIGURE 4, the flame detector 12 is disposed within an outer casing 14. Inwardly spaced fins 16 of the casing hold the detector 12 axially within the casing 14, in line with an aperture means 18 in the front of the casing. No cooling air flows within the casing 14 outside of the detector 12.

Referring to FIG. 1, the detector 12 comprises an outer cylindrical housing 20 to which cylindrical front piece 22 is fastened, the front piece 22 having a front face 23. In the latter, an aperture 24 is disposed axially relative the housing 20 in line with the outer casing front opening 18 and designed to admit ultraviolet light into the interior of the housing 20. The front face is also provided with a plurality of peripherally spaced passageways 25 spaced radially outward from the aperture 24. On the inside of the front piece 22, a lens 26 is suitably engaged in line with both the aperture 24 and the casing aperture means 18.

Within the cylindrical housing 20, an electronic tube or ultraviolet sensing device 30 is axially disposed and situated so as to be exposed to the ultraviolet light passing through aperture 24 and lens 26. The tube 30 is seated in socket 32, from which electrical leads 34 lead. Towards holding the tube 30 and tube socket 32 in place axially within the cylindrical casing 20, a seated spring 36 abuts plate means 35 the latter holding tube socket 32. The pressure of the spring 36 forces the plate means 35 towards the detector front piece and against stops 38 disposed at spaced points around the inside of the casing 20. Reference at this point can be had to FIG. 2 which shows the electrical leads 34 centered within the casing 20 and plate means 35 which holds the electrical tube socket 32. As shown the plate is provided with a plurality of apertures or openings 37 through which cooling air is allowed to pass.

Referring again to FIG. 1, the detector element in accordance with the invention, is provided with an insert 40 which encompasses the electronic tube 30. The insert 40 is provided with an outer cylindrical surface which contacts the inside surface of the front piece 22 and is suitably held in the latter, against face 23, by set screws, as shown. The insert which is hollow, has an inner cylindrical surface 41 substantially coextensive with the axis of the electronic tube 30, and an inside conical surface 44 extending forwardly from the cylindrical surface 41 flaring inwardly to an axial opening 42 in line with both the aperture 24 and the axis of the electronic tube 30. As shown, these inside surfaces of the insert approximately parallel the surface of the electronic tube 30. Forward of the opening 42, the insert is provided with a further conical surface 46 flaring outwardly from the opening 42 to a circumference outside of the spaced passageways 25 so that the cooling air flowing around the electronic tube 30 and through opening 42 flows outwardly through the passageways 25.

These aspects of the detector can further be seen in FIG. 3 showing the aperture 24, opening 42 in the insert, and, in dashed lines, the plurality of circumferentially spaced passageways 25. FIG. 3 also shows the conical inside surface 44 of the insert 40. The insert may be constructed or molded of lava, or known ceramics, and should be both heat resistant and non-conductive of heat, and non-metallic as to not interfere with the electron tube.

In operation, cooling air supplied by suitable source 54 (FIG. 4) passes through tube 52 (FIG. 4) and passageway 48 (FIG. 1) around the sensing element 30 and outwardly through the passageways 25.

At this point, it should be noted that the cooling air passing through opening 42 also impinges on lens 26 and cools the lens from excess heat, and cleans the lens of foreign particles.

To keep the air from source 54 in passageway 48 cool, and in this respect the distance from the source to the sensing element 30 may be quite extensive and within very high temperature zones of a burner, the conduit 52 is insulated along its length. Also, it is a flexible member designed to bend and follow the movement of the head or outside casing 14 within the burner. Source 54 is stationary.

As the casing 14 is not insulated, and merely serves to support the flame detector 12, it is not necessary to pass cooling air within the casing and outside of the conduits 50 and 52 and detector 12. As the insert 40 is dimensioned so that its inside surface is fairly close in the order of .025 to .050 inch from the electronic tube, providing a high velocity uniform flow around the tube, there is a substantial saving in air, which as mentioned above, amounts to about 5 s.c.f.m. at one-half pound pressure, as compared to conventional requirements of about 100 s.c.f.m. at 5 pounds pressure.

Although the invention has been described with respect to specific embodiments, variations within the scope of the following claims may be apparent to those skilled in the art.

What is claimed is:

1. A flame detector comprising
   a housing including an open end;
   a front piece partly closing said open end, said piece comprising a front face including aperture means disposed axially relative the axis of the housing, a plurality of passageways spaced peripherally from said aperture means in said front face;
   an ultraviolet sensing element within the tube;
   means positioning the sensing element axially within the tube in line with the aperture means close to but spaced from said front face;
   source means to flow a cooling fluid in said housing through said passageways;
   an insert within said housing encompassing said sensing element, the insert comprising an opening axially disposed between the sensing element and said front face, an inside surface approximately paralleling the surface of said sensing element to direct a uniform flow of cooling fluid over the surface of said sensing element, and outwardly to said passageways;
   the insert being of a heat resistant non-heat transmitting non-metallic material.

2. A flame detector according to claim 1 wherein said insert is of a material of the class consisting of lava and ceramic.

3. A flame detector according to claim 1 further comprising
   a flexible conduit between said housing and source means;
   heat insulation for said conduit.

4. A flame detector according to claim 1 wherein the sensing element comprises a domed glass cover, said insert being a hollow elongated member comprising a first inside surface which is at least substantially cylindrical in shape and substantially coextensive with the sensing element, a conical second surface contiguous with and flaring inwardly from the first surface towards said insert opening, and a third surface also which is conical flaring outwardly from said opening to a point radially outward of said front face spaced passageways.

5. A flame detector according to claim 4 wherein said insert opening forces cooling air across said lens means cooling the latter.

6. A flame detector according to claim 1 wherein lens means are disposed between said aperture means and said sensing element.

References Cited
UNITED STATES PATENTS

| | | | |
|---|---|---|---|
| 2,291,448 | 7/1942 | Bragg | 73—355 |
| 2,565,249 | 8/1951 | Machler | 73—355 |
| 2,959,090 | 11/1960 | Davies | 350—63 X |
| 3,075,113 | 1/1963 | Soar | 313—17 |
| 3,080,755 | 3/1963 | Percy | 73—355 |
| 3,185,846 | 5/1965 | Gilbert et al. | 250—83.6 |
| 3,241,595 | 3/1966 | Gilbert | 431—23 |

ROBERT SEGAL, *Primary Examiner.*

U.S. Cl. X.R.

73—355; 250—83.3; 340—227

U.S. DEPARTMENT OF COMMERCE
PATENT OFFICE
Washington, D.C. 20231

UNITED STATES PATENT OFFICE
CERTIFICATE OF CORRECTION

Patent No. 3,437,807                                              April 8, 1969

William J. Moore

It is certified that error appears in the above identified patent and that said Letters Patent are hereby corrected as shown below:

Column 4, line 28, "5." should read -- 6. --; line 28, the claim referen numeral "4" should read -- 5 --; line 31, "6." should read -- 5. --.

Signed and sealed this 31st day of March 1970.

(SEAL)
Attest:

Edward M. Fletcher, Jr.                                  WILLIAM E. SCHUYLER, JR.
Attesting Officer                                                Commissioner of Patents